US009237551B2

(12) United States Patent  
Essigmann

(10) Patent No.: US 9,237,551 B2  
(45) Date of Patent: Jan. 12, 2016

(54) PAGING A MOBILE ENTITY IN MOBILE NETWORKS

(75) Inventor: Kurt Essigmann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/349,236

(22) PCT Filed: Oct. 4, 2011

(86) PCT No.: PCT/EP2011/067343  
§ 371 (c)(1),  
(2), (4) Date: Apr. 2, 2014

(87) PCT Pub. No.: WO2013/050067  
PCT Pub. Date: Apr. 11, 2013

(65) Prior Publication Data  
US 2014/0243026 A1    Aug. 28, 2014

(51) Int. Cl.  
*H04W 68/02*    (2009.01)  
*H04W 60/02*    (2009.01)

(52) U.S. Cl.  
CPC .............. *H04W 68/02* (2013.01); *H04W 60/02* (2013.01)

(58) Field of Classification Search  
CPC ... H04W 68/00; H04W 68/005; H04W 68/02; H04W 68/025  
USPC ........ 455/426.1, 458, 515, 456.1–457, 404.1, 455/404.2  
See application file for complete search history.

(56) References Cited

U.S. PATENT DOCUMENTS

| 5,369,681 | A | * | 11/1994 | Boudreau et al. | .......... 455/456.1 |
| 5,924,042 | A | * | 7/1999 | Sakamoto et al. | ............ 455/458 |
| 6,745,039 | B1 | * | 6/2004 | Di Lalla | .......................... 455/458 |
| 2009/0181647 | A1 | * | 7/2009 | Benco et al. | .................... 455/413 |
| 2010/0081455 | A1 | * | 4/2010 | Teasdale et al. | ........... 455/456.1 |

FOREIGN PATENT DOCUMENTS

EP    0 732 863  A2    9/1996

OTHER PUBLICATIONS

International Search Report, Application No. PCT/EP2011/067343, May 11, 2012.  
Written Opinion of the International Searching Authority, Application No. PCT/EP2011/067343, May 11, 2012.

(Continued)

*Primary Examiner* — Vladimir Magloire  
*Assistant Examiner* — Erica Navar  
(74) *Attorney, Agent, or Firm* — Myers Bigel Sibley & Sajovec, P.A.

(57) ABSTRACT

The present invention relates to a method for paging, by a network mobility management unit, a mobile entity in a cellular network. The method includes receiving plural location reports, each respectively including an indicator indicating a position of the mobile entity, determining whether indicators included in at least two successive location reports indicate a position in a same second area, selectively setting paging control information for the mobile entity to a first area mode or to a second area mode based on said determining, paging the mobile entity in a first area of the cellular network when the paging control information is set to the first area mode, or paging the mobile entity in said second area when the paging control information is set to the second area mode. The second area is a sub-area of the first area.

10 Claims, 10 Drawing Sheets

(56) References Cited

OTHER PUBLICATIONS

International Preliminary Report on Patentability, Application No. PCT/EP2011/067343, Sep. 26, 2013.
Hong et al., "Cost-Effective IP Paging for Wireless Internet", *IEEE 2007 Global Telecommunications Conference*, Nov. 26-30, 2007, pp. 1982-1986.
3GPP, Technical Specification, "3rd Generation Partnership Project; Technical Specification Group Core Network and Terminals; Numbering, addressing and identification (Release 10)", 3GPP TS 23.003 V10.2.0 (Jun. 2011), 80 pp.
3GPP, Technical Specification, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10)", 3GPP TS 48,018 V10.2.0 (Jun. 2011), 182 pp.

* cited by examiner

PAGING A MOBILE ENTITY IN MOBILE NETWORKS

CROSS REFERENCE TO RELATED APPLICATION

This application is a 35 U.S.C. §371 national stage application of PCT International Application No. PCT/EP2011/067343, filed on 4 Oct. 2011, the disclosure and content of which is incorporated by reference herein in its entirety. The above-referenced PCT International Application was published in the English language as International Publication No. WO 2013/050067 A1 on 11 Apr. 2013.

TECHNICAL FIELD

The present invention relates to a method for paging, by a network mobility management unit, a mobile entity in a cellular network and a network mobility management unit.

BACKGROUND

Radio resources on mobile radio networks currently are and will for the foreseeable future be a scarce resource. Already, data traffic used for paging of mobile entities consumes a considerable fraction of the total available radio resources. At the same time, such data traffic dedicated to paging increases for an increasing number of mobile devices. Paging is needed to fulfill a number of tasks, such as to identify the cell in which a mobile entity is currently located in.

Paging of mobile entities in a 2G, 3G (and 4G) context is currently executed in a routing area, a set of routing areas, a location area, or a set of location areas. Such areas comprise a number of radio cells or cells. The amount of radio resources in a routing area needed for paging scales with increasing number of mobile entities attached to the routing area. With the massive addition of devices to mobile networks that require low bandwidth, know as the "50 Billion" initiative, the amount of paging can outnumber the available/acceptable radio resources on radio channels.

In particular, the number of "machine to machine" (M2M) devices is increasing. Such devices typically automatically send or receive some type of information over a radio network from time to time. Often, such devices are stationary at one position and do not move because they form part of a stationary system. When the number of M2M Devices reaches a significant size, e.g. some millions in a network of some 20-30 millions conventional subscribers, the paging channels would be overloaded. Then operators would have to assign a second channel per cell for paging. As the expected average revenue of the M2M devices is low compared to conventional subscribers, such an additional channel is unlikely to generate revenue. Therefore, increasing the available resources would be costly and technically challenging.

Therefore, with increasing numbers of mobile entities, the available radio resources are more and more exhausted due to the increasing amount of resources dedicated to paging of mobile entities.

SUMMARY

Accordingly, a need exists to reduce the amount of radio resources needed for paging of mobile entities in a cellular network.

This need is met by the features of the independent claims. In the dependent claims preferred embodiments are described.

According to an aspect, a method for paging, by a network mobility management unit, a mobile entity in a cellular network is provided. The method comprises receiving plural location reports, each respectively including an indicator indicating a position of the mobile entity. The method further comprises determining whether indicators included in at least two successive location reports indicate a position in a same second area. The method further comprises selectively setting paging control information for the mobile entity to a first area mode or to a second area mode based on said determining. The method further comprises paging the mobile entity in a first area of the cellular network when the paging control information is set to the first area mode, or paging the mobile entity in said second area when the paging control information is set to the second area mode, wherein said second area is a sub-area of the first area.

By selectively setting the paging control information such that an individual mobile entity is paged in either the first area or the second area, the overall radio resources for paging can be decreased compared to a case where only paging in a first area. If paging occurs in a first area only, which is larger than the second area, the second area being a sub-area of the first area, then the area in which radio resources are allocated due to paging is larger for each mobile entity. Averaging over a number of mobile entities which are all connected to the network, the overall required radio resources are higher when paging in larger areas for each mobile entity. Therefore, by providing the possibility to page in a sub-area, i.e. the second area, the overall required radio resources for paging mobile entities in a network can be reduced.

For a M2M device, which is not moving, the network does not have to page the M2M device for each downlink transaction in the whole routing area or even in a number of routing areas.

By determining whether indicators included in at least two successive location reports indicate a position in a same second area and using for a decision on whether to page in the larger first area or the smaller second area, the likelihood for successful paging may be increased. The smaller the paging area is, i.e. the area in which a certain mobile entity is paged, the higher the risk that a mobile entity has moved out of this area. Therefore, if it is determined that at least two successive location reports indicate a position in the same second area, the likelihood that mobile device is at least temporarily stationary increases. Here temporarily stationary may describe a situation where a mobile entity remains at one position for an extended period of time. This may be the case as users of a mobile entity do not travel all the time, i.e. remain stationary for example during work or at home. Another possibility is that a mobile entity is a M2M device. Such a M2M device typically remains stationary over an extended period of time, for example because it forms part of a stationary system. By reducing the radio resources needed for paging as outlined above and, at the same time, increasing the likelihood for successful paging, a cellular network which allows for both, i.e. robust paging, as well as reduced occupied radio resources, may be provided.

It may be desired to increase the likelihood of successful paging for numerous reasons. One of those reasons is that if a paging attempt fails, the network mobility management unit may be configured to retry paging due to the preceding failure. This means, the frequency of paging a certain mobile entity may increase and with it the respectively occupied radio resources. Therefore, a high likelihood of successful paging may, in such a situation, allow decreasing the radio resources dedicated to paging.

In particular, the first area may be a routing area of the cellular network and the second area may be a cell of the cellular network. While conventionally paging is performed in a routing area or a set of routing areas, paging may be performed on cell level as outlined above. To this respect, the term location report may refer to a "cell global identity" (CGI) as defined in the context of 2G/3G networks, for example in the 3GPP standard. Here a CGI contains a cell identification (CI) of the cell of a cellular network in which an originating mobile entity is camping on, i.e. is currently located in. Therefore, by receiving a location report in the form of a CGI, it is possible to determine the cell, which, in one embodiment corresponds to the second area, in which a mobile entity is located. However, a location indicator may also refer to geographical coordinates. For example, a mobile entity may be equipped with a global positioning system, which may be used to obtain the geographic coordinates. It is possible to determine whether geographical coordinates are located within a certain second area. Various other forms of location reports are possible.

It may also be established whether the mobile entity is successfully paged while the paging control information is set to the first area mode, wherein, if it is established that the mobile entity is successfully paged for a predefined number of times in succession and if it is determined during paging for the predefined number of times that the indicators in the location reports indicate positions in the same second area, the paging control information may be set to the second area mode.

By basing a decision whether or not to set the paging control information to the second area mode, i.e. paging in a second area, on both the establishing of successful paging and the determining of location reports including indicators indicating a position of the mobile entity in the same second area, a set of two conditions is provided, which increases the likelihood for successful paging. For example, if a mobile entity is within an area of weak reception, this means low signal level of the data connection, some paging attempts may be unsuccessful due to data loss. When setting in such a situation the paging control information to the second area mode, this means that the mobile entity is paged in this second area only, the likelihood of unsuccessful paging is further increased. This may be unwanted in a situation as described.

In more detail, when the paging control information is set to the first area mode, a counter may be adjusted based on said establishing and based on said determining, once the paging control information may be set to the second area mode based on a threshold comparison of said counter. In this context, establishing refers to establishing whether the mobile entity is successfully paged while the paging control information is set to the first area mode and determining refers to determining whether indicators included in at least two successive location reports indicate a position in the same second area.

When maintaining a counter which is adjusted outlined, a more sophisticated criterion for when to switch to paging in the second area may be defined. As outlined above, the design of a cellular network, which is robustly paging and is optimized with respect to radio resources, has to consider these two opposed design goals; namely to provide robust paging, and to reduce the radio resources allocated for paging. By adjusting a counter as outlined, it is possible to account for both these design goals. In particular, a flexible weighting of these two design goals is possible, for example by accordingly setting a threshold or the amount of adjustment.

When the paging control information is set to the first area mode, the counter may be adjusted towards a threshold if it established that the paging has been successful, and the counter may be adjusted away from the threshold, if it is established that the paging has been unsuccessful or if it is determined that indicators included in at least two successive location reports indicate positions in different second areas. The paging control information may be set to the second area mode if the counter reaches the threshold. As outlined above, when it is established that the paging has been successful, it is more likely that the paging success likelihood is not negatively influenced by any factors, and therefore the counter may be adjusted towards the threshold. In the same sense, if it is established that paging has been unsuccessful, the counter may be adjusted away from the threshold. Moreover, if it is determined that indicators included in at least two successive location reports indicate positions in different second areas, the counter may be adjusted away from the threshold, because then it is more likely that the mobile entity does not remain stationary within a second area. The amount of adjusting the counter value with respect to the threshold value may differ from case to case.

In particular, the counter may be incremented if it is established in the first area mode that paging has been successful and decremented if it is established in the first area mode that paging has been unsuccessful. At the same time, the counter may be reset to zero and the paging control may be set to the second area mode if at least one of the following occurs: it is determined that indicators included in at least two successive location reports indicate positions in different second areas, the mobile entity is attached or detached from the cellular network, the mobile entity is associated with another network mobility management unit different from said network mobility management unit, it is established that paging the mobile entity in the second area has been unsuccessful for another predefined number of times.

Incrementing and decrementing the counter can refer to increasing or decreasing the value of the counter by a value of one. Also, other steps of incrementation (decrementation) are possible. In the above embodiment, the counter may be a positive integer value. If the counter is incremented because of determining successful paging in the first area mode, at some point it may reach the positive integer value of the counter. When the counter is equal or larger than the positive integer number of the counter value, the paging control information may be set to the second area mode such that from then on the mobile entity is paged in the second area. Other forms of threshold comparison are possible.

At the same time, whenever it is detected that the paging control information of at least two successive location reports differ with respect to the second area, the counter may be reset to zero. This means, that because of the fact that the mobile entity is detected to be moving with respect to the second area, the counter value may not reach the threshold and therefore it is avoided to page the mobile entity in the second area. This increases the likelihood of successful paging. Also, when paging in the second area mode and resetting the counter to zero, the counter value drops below the threshold and paging commences in the first area mode.

It may also be the case that it is established that paging of the mobile entity in the second area has been unsuccessful for another predefined number of times. If this happens for another predefined number of times, the counter may be reset to zero and the paging control information may be set to the first area mode. Then the mobile entity is again paged in a larger first area.

In particular, if it is established that paging of the mobile entity in the second area has been unsuccessful once, i.e. the another predefined number of times equals one, the counter may be reset to zero and the paging control information may be set to the first area mode.

Unsuccessfully paging for another predefined number of times in a second area may be one of many possible criteria for when switching back to paging in a first area, i.e. setting the paging control information to the first area mode. Other criterions are conceivable. For example, a timer may be used. The timer may be initialized when paging in the second area mode is unsuccessful for the first time. Successful paging may result in disengaging the timer. The time may be incremented over time. Once the timer reaches a certain threshold, a criterion for resetting the counter to zero and with it setting the paging control information to the first area mode may be fulfilled.

When the paging control information is set to the first area mode, the mobile entity may be paged in a first area in which the position of the mobile entity indicated by the last received location report is located. Moreover, when the paging control information is set to the second area mode, the mobile entity may be paged in a second area in which the position of the mobile entity indicated by the last received location report is located. When setting the paging control information from the first area mode to the second area mode or vice versa, it may be set such that it includes the last indicated position of the mobile entity. By way of example, a mobile entity may be paged for the first time in a specific second area. This may be because the paging control area is newly set to the second area mode. Then the specific second area may be the second area indicated by the last received location report. This may ensure that the mobile entity is paged in the second area in which it is currently located. Then, because the area in which the mobile entity is paged includes the last known position of the mobile entity, the likelihood for successful paging is increased.

With respect to the first and second areas, it may be possible that plural first and second areas are fixedly distributed in an area covered by the cellular network, and the indicators included in the plural location reports respectively identify one of the plural second areas. Typically, in the case of a cellular network, there are several cells distributed across the area of the cellular network as outlined above. The cells are physically defined by stationary transceivers establishing cellular connection to mobile entities. A number of cells may be grouped in a routing area, which is typically managed by certain units such as a network mobility management unit. A cell global identifier may identify one of the cells in which a mobile entity is currently located.

According to a further aspect, a network mobility management unit for paging a mobile entity connected to a cellular network is provided. The network mobility management unit comprises a receiver, which is configured to receive plural location reports, each respectively including an indicator indicating a position of the mobile entity, and a mobile entity management unit which is configured to selectively set paging control information for the mobile entity to a first area mode or to a second area mode based on whether indicators included in at least two successive location reports indicate positions in the same second area. The mobile entity management unit is further configured to page the mobile entity in a first area of the cellular network when the paging control information is set to the first area mode, and to page the mobile entity in said second area when the paging control information is set to the second area mode, wherein said second area is a sub-area of the first area.

For a system having such a configuration, effects corresponding to the effects explained for the corresponding method may be attained.

BRIEF DESCRIPTION OF THE DRAWINGS

The invention will be described in further detail below with reference to the accompanying drawings. In these drawings.

DETAILED DESCRIPTION

Figure 1:
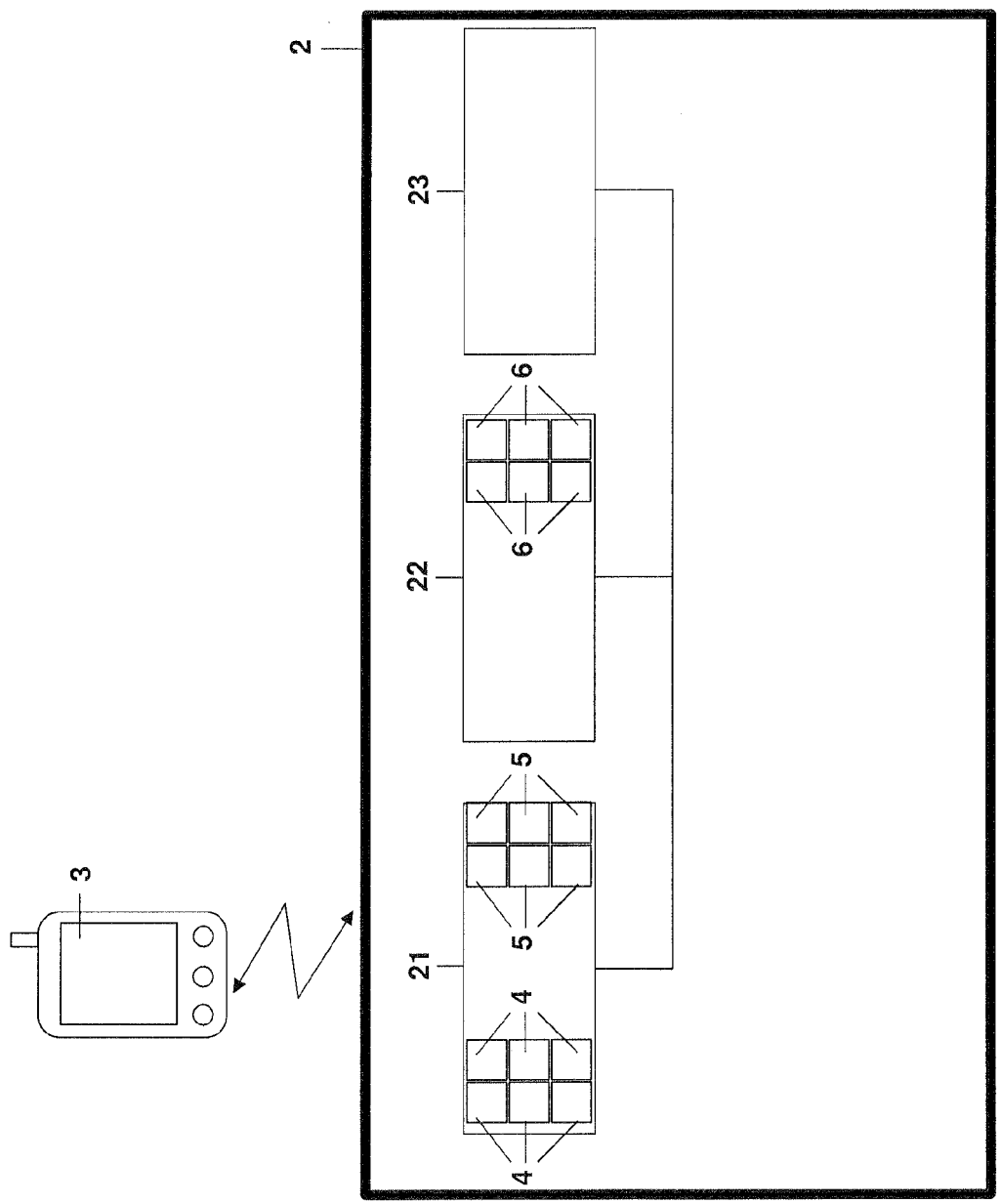
FIG. 1 is a schematic view of the components of a network mobility management unit and of a mobile entity.

FIG. 1 shows a network mobility management unit 2 and a mobile entity 3 which is attached to the network mobility management unit 2. The network mobility management unit 2 and the mobile entity 3 can exchange data, which is indicated by the arrow. The network mobility management unit 2 comprises a receiver 22 which can be used to receive data. The network mobility management unit 2 is able to establish and maintain connection to a plurality of mobile entities. In particular, a mobile entity 3 may be a M2M mobile entity. M2M mobile entities typically will remain stationary, i.e. they do not move.

The receiver 22 is configured to receive plural location reports 6 from the various mobile entities which are attached to the network mobility management unit 2. This is indicated by a set of six location reports which are provided within receiver 22, but is not limited to this number. The receiver stores a number of recent location reports for each attached mobile entity 3.

Furthermore, the network mobility management unit 2 comprises a transmitter 23, which is able to transmit data to each attached mobile entity 3. Such data may be data relating to voice, data packets, or mobility management data traffic such as paging of mobile entities.

Paging of a mobile entity is performed by the network mobility management unit 2 when it is intended to send data to the mobile entity. Typically, if the network mobility management unit 2 pages a mobile entity 3, a specific paging message is sent. Mobile entity 3 responds to the reception of this paging data packet with a paging acknowledgement data packet. If this acknowledgement is successfully received by the network mobility management unit 2, paging was successful. The acknowledgement data packet contains further information, for example a location report 6 including an indicator indicating a current position.

In a 2G/3G network the network mobility management unit 2 may be a network mobility management entity (N-MME). If the mobile entity is a M2M device which is semi-stationary, the N-MME initially pages the M2M device as any other mobile entity on routing area, on BSS area or even on a set of routing areas. In addition, the N-MME monitors and store a value indicating a paging success rate and monitors the physical location of the device by comparing the cell global identity (CGI) of each up-stream data frame. This will be explained in detail below. By means of these 2 parameters, the N-MME determines the probability of the mobile station to be a semi-stationary M2M device. Upon detection that a certain mobile entity is such a semi-stationary M2M device, the N-MME initiates paging on cell-level only, instead of paging on routing area or on a set of routing areas. This is done by setting the paging control information to the second area mode. However, whenever the paging attempts fails once or when the CGI of a up-stream data frame differs from the CGI of a previous frame, the M2M device will be treated as a regular mobile entity and paging will be performed in a first area, such as a routing area, BSS area or a set of routing areas. This is done by setting the paging control information to the first area mode.

In particular, a mobile entity management unit 21 is comprised within network mobility management unit 2. The mobile entity management unit 21 provisions and handles paging control information 5 for the various attached mobile entities 3. Furthermore, it provisions and handles counters 4 for the various attached mobile entities 3.

The paging control information 5 can be set to either a first area mode or a second area mode. When set for a mobile entity 3 to the first area mode, the network mobility management unit 2 is configured to page the respective mobile entity 3 in a first area of the cellular network. However, when set to the second area mode, the network mobility management unit 2 is configured to page the respective mobile entity 3 in a second area. The second area is a sub-area of the first area.

In the case of the embodiment of FIG. 1, the cellular network is a 2G, 3G or 4G network. Then the first area corresponds to a routing area or a set of routing areas. The second area corresponds to a cell. Therefore, the second area is typically smaller than the first area.

The counter 4 is used to establish a decision criterion when the paging control information 5 is set to the first or second area mode. Furthermore, each of the counters 4 is associated with a predefined threshold 31. When the counter value reaches or exceeds the respective predefined threshold, a certain operation is triggered. This will be explained in further detail below, for example with respect to FIG. 8.

Mobile entity management unit 21 can individually handle the counters 4 and paging control information 5 for the different mobile entities. For example, one mobile entity 3 may have a paging control information 5 which is set to the first area mode, while another mobile entity 3 may have a paging control information 5 which is set to the second area mode.

The provisioning of the different types of information, such as the counter 4, the paging control information 5, or the location report 6 may be implemented in the form of databases. Different databases contain this information and are updated from time to time whenever information changes.

Figure 2:
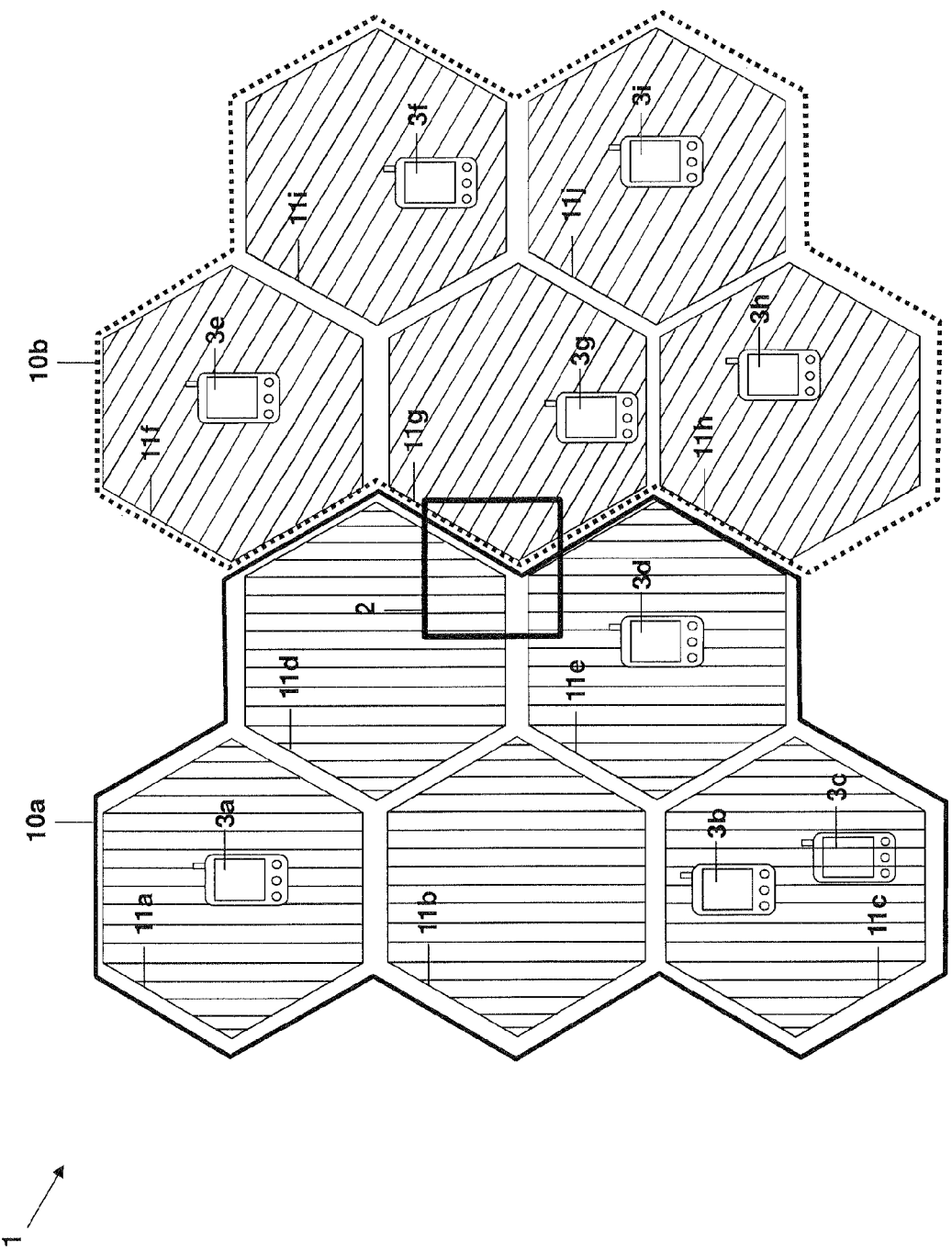
FIG. 2 is a schematic view of a cellular network.

In FIG. 2, a cellular network 1 is depicted. The cellular network may be a 2G, 3G or 4G network. The cellular network 1 comprises a number of ten cells 11a-11j. The cells 11a-11j are graphically indicated by hatched hexagons. Of the ten cells, five cells 11a-11e belong to a first routing area 10a, while other cells 11f-11j belong to a second routing area 10b. A network mobility management unit 2 is provided within the cellular network 1, possibly in the form of a N-MME. As explained with respect to FIG. 1, the network mobility management unit 2 is configured to page different mobile entities 3a-3f, which are connected to the cellular network 1 and respectively are attached to the network mobility management unit 2. Some of the mobile entities are M2M devices. Such devices typically remain stationary within the network. In particular, the different mobile entities 3 are connected to the cellular network 1 via different cells. A cell resembles the basic building block of the cellular network 1 in terms of providing a stationary transmitter and receiver for establishing connections to the different mobile entities. While the cells 11b, 11d comprise no mobile entity, other cells 11a, 11e, 11f, 11g, 11h, 11i, 11j comprise one mobile entity and one cell 11c comprises two mobile entities.

The network mobility management unit 2 is configured to page each mobile entity 3a-3i in either a first area mode, which corresponds to paging the respective mobile entity in one of the routing areas 10a, 10b, or in a second area mode, which corresponds to paging the respective mobile entity in one of the respective cells 11a-11j.

Considering a case where all mobile entities 3a-3i are paged in the first area mode, the number of paging events per time, for example in the area of cell 11b is four. This is the case because four mobile entities 3a-3d are present in the first routing area 10a to which the cell 11b belongs. However, if all those mobile entities 3a-3d are paged in the second area mode, this means on cell-level, the number of paging events per time in the cell 11b is zero. This is the case because no mobile entity is located within this particular cell 11b. Paging certain mobile entities on cell-level may occur because the entities are M2M devices. This example illustrates that in case mobile entities 3a-3d are paged with paging control information set to the second area mode, the radio resources needed for paging are reduced.

Paging the different mobile entities 3a-3i on cell-level, this means in the second area mode, may be desired, if all mobile entities remain stationary. In this context, stationary means that the different mobile entities remain located within the respective cells in which they are paged at least for a certain number of paging procedures. This may be the case particularly for mobile entities in the form of M2M devices.

Figure 3:
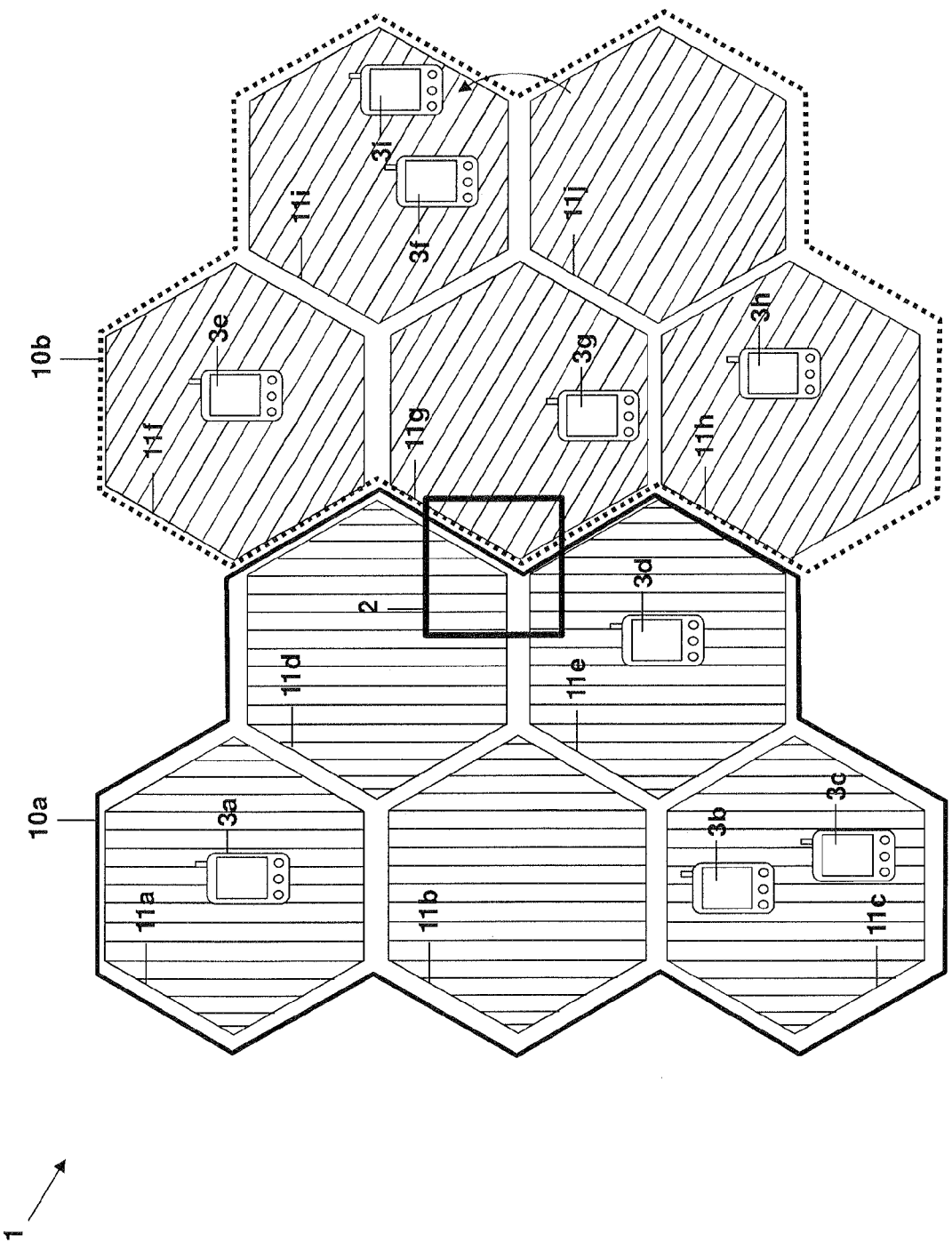
FIG. 3 is a schematic view of a cellular network.

However, with respect to FIG. 3, a situation is explained, where a certain mobile entity 3i changes its position such that it is located not any more in cell 11j (this was the case with respect to FIG. 2), but in another cell 11i. This is indicated by the arrow in FIG. 3. In such a situation, paging the certain mobile entity 3i in cell 11j, fails. Mobile entity 3i is not located anymore within cell 11j. However, paging mobile entity 3i within routing area 10b is successful (assuming no data loss during paging). Paging the certain mobile entity 3i in the routing area 10b corresponds to setting paging control information to the first area mode. Accordingly, paging mobile entity 3i only in cell 11j corresponds to setting the paging control information to the second area mode at a time when mobile entity 3i is still located within this cell 11j. A situation where paging is unsuccessful due to a mobile entity 3 leaving a certain cell 11 should be avoided. This will be subject to the discussion of FIGS. 5-9 below.

Figure 4:
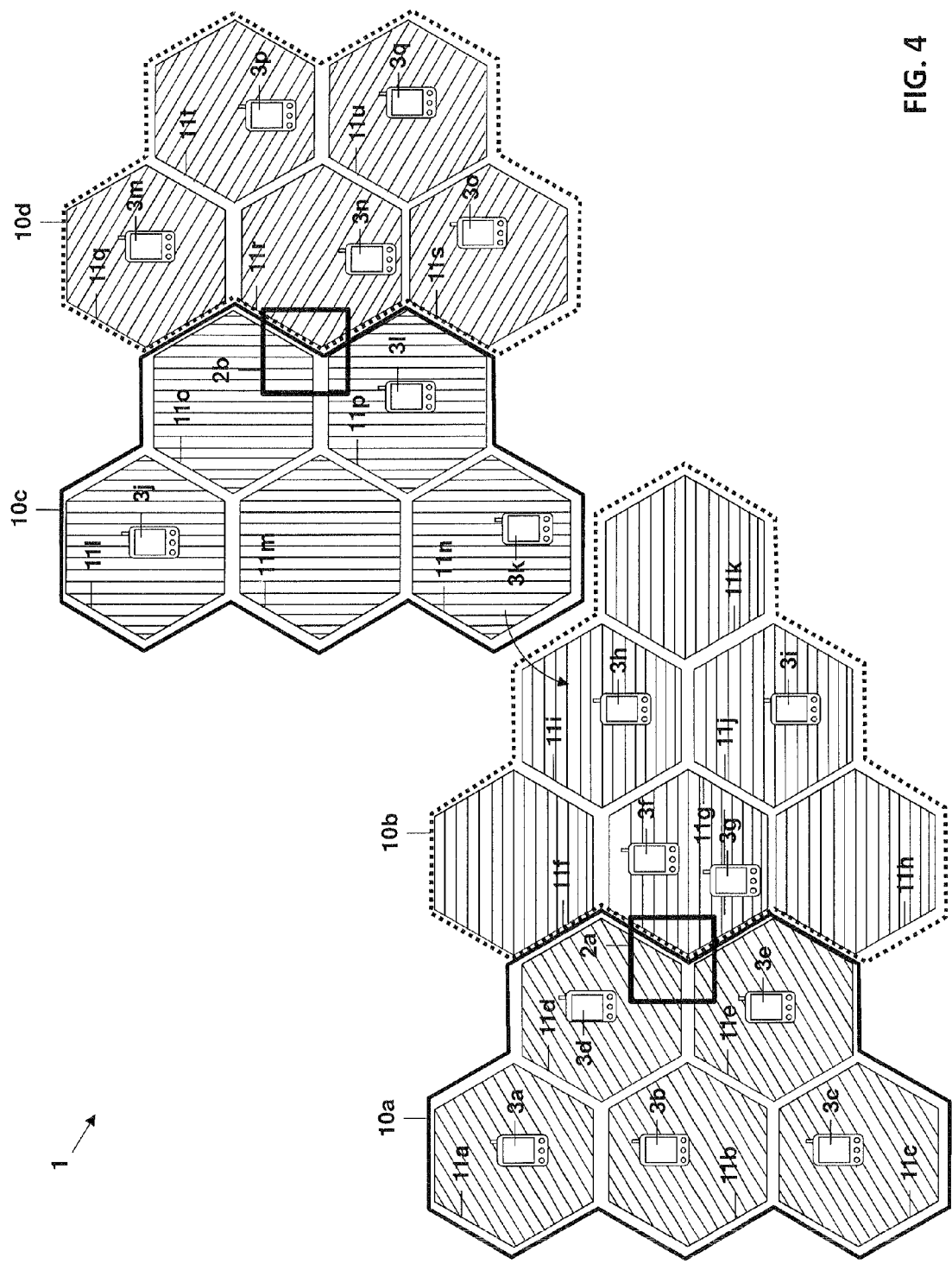
FIG. 4 is a schematic view of a cellular network.

FIG. 4 illustrates a situation where a certain mobile entity 3h changes its location. Different to FIG. 3, in FIG. 4, a situation is depicted, where the mobile entity 3h changes its location not only with respect to a cell (from cell 11n to cell 11i), but also with respect to a routing area (from routing area 10c to routing area 10b). This is referred to roaming, where the mobile entity is detached from the one mobility management unit 2b and attached to another mobility management unit 2a. Such a situation will be further illustrated with respect to FIG. 7 below.

Another possibility where a mobile entity detaches from the one mobility management unit 2b and attaches to another mobility management unit 2a is that, due to network reconfigurations, a new network mobility management unit 2 serves a certain mobile entity 3.

In the embodiment of a 2G/3G network according to the 3GPP standards, a mobility management server, e.g. a serving GPRS support node (SGSN) or a Mobility Management Entity (MME), may send a context request from the old network mobility management entity (N-MME) to the new N-MME. A context response, e.g. an SGSN context response, is issued by the new N-MME.

With respect to FIG. 1 it was discussed that a counter may be used to determine when to selectively set the paging control information to either the first or second area mode. When the counter reaches a threshold, the paging control information may be set to the second area mode. This corresponds starting to page the respective mobile entity in the second area in which the most recently received location report included an indicator indicating the position of the mobile entity.

Figure 5:
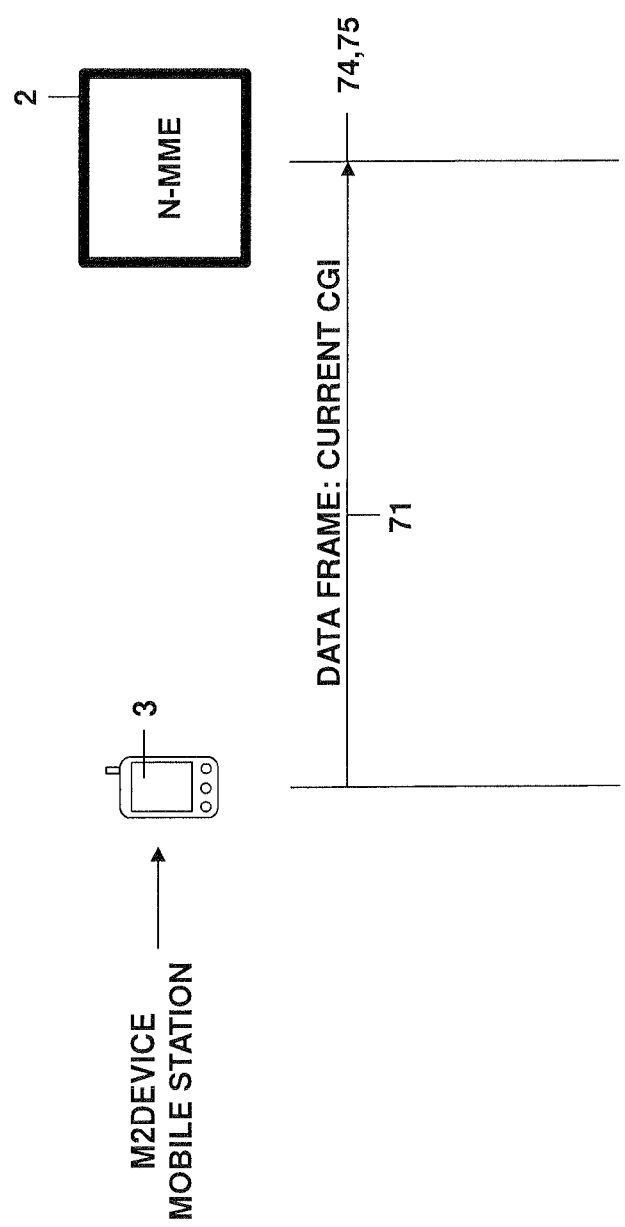
FIG. 5 shows the receiving of a location report from a mobile entity by a network mobility management unit.
Figure 6:
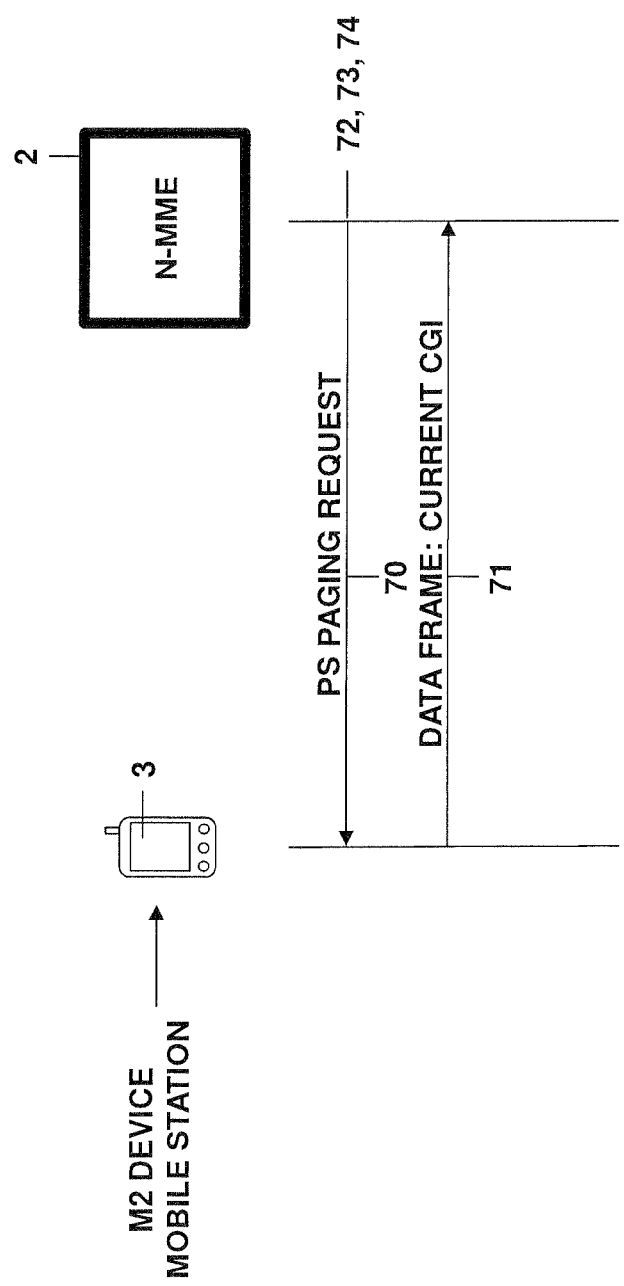
FIG. 6 shows the paging of a mobile entity by a network mobility management unit.
Figure 7:
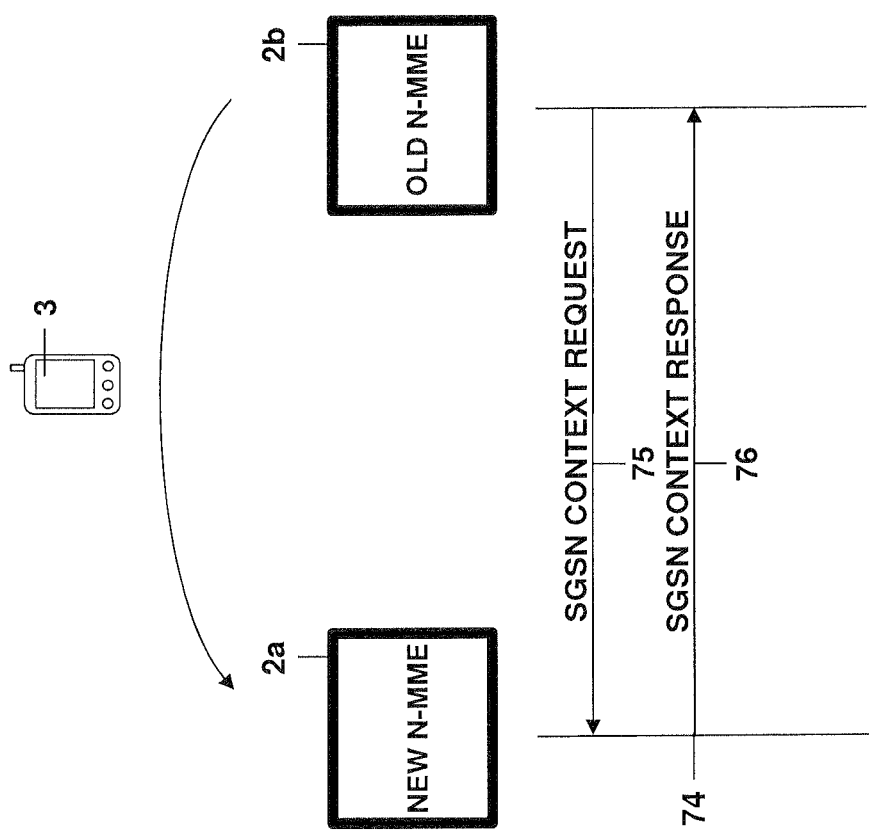
FIG. 7 shows the roaming of a mobile entity from one mobility management unit to another mobility management unit.

The adjusting of the counter is explained in further detail with respect to FIGS. 5-7 for situations as discussed with respect to FIGS. 2-4. In particular, these Figures refer to embodiments according to the 2G/3G or 3GPP standard where the network mobility management unit is identify as a N-MME. A mobile entity may be identified with a M2M device. First, FIG. 5 illustrates the receiving 71 of a location report. A mobile entity 3 for example a M2M device is configured to send from time to time a location report to a network mobility management unit 2. This is indicated by the horizontal arrow. Such location report may be sent in the form of a CGI, which includes a cell identity (CI) which identifies the cell in which the mobile entity 3 is currently located. For example, in a 2G/3G network, a CGI is contained in the header of an uploaded data frame.

In FIG. 5, the location report is received 71. Then the counter, in the embodiment of FIG. 5, is either set to zero 74 or left unchanged 75. In case the received location report equals the location report which was previously received, i.e. two successively received location reports include indicators which indicate a position in the same second area, the counter is left unchanged 75. However, if two successively received location reports include indicators which indicate positions in different second areas, the counter is reset 74 to zero. By resetting the counter to zero as explained, it is ensured that the counter does not reach the threshold value. In case the indicators indicate positions in different second areas, it may be assumed that the mobile entity is not remaining stationary. Then setting the paging control information to the second area mode, i.e. decrease the area in which the (moving) mobile entity is paged, would decrease the likelihood of successful paging.

With respect to FIG. 6, a situation is graphically illustrated, where a network mobility management unit 2 pages 70 a mobile entity 3. The paging 70 is indicated by the left horizontal arrow. The paging 70 as discussed with respect to FIG. 6 occurs for paging in a first area, i.e. the paging control information is set to the first area mode. Paging is performed in a routing area. However, it should be understood that similar conditions for paging as outlined below may be applied for paging in the second area mode.

Because the mobile entity 3 receives the paging 70, it responds appropriately indicating that paging was successfully received. An acknowledgement message is sent back. Such a response includes a location report. The location report included in the response to the paging 70 of the mobile entity 3 is received 71 by the network mobility management unit 2.

When the location report is received 71, different steps are possible. First, it is possible that the counter is incremented 72. The counter is incremented 72 if the two successively received location reports include indicators which indicate a position in the same second area. However, if it is determined that two successive indicators indicate positions in different second areas, the counter is reset to zero.

Another possibility is that paging has not been successful. This can be the case because either the paging 70 or the paging acknowledgement is not received at all or not received correctly by either the network mobility management unit 2 or the mobile entity 3. If paging has not been successful, the counter is decremented 73.

With respect to FIG. 7, a further situation is graphically illustrated in which a mobile entity 3 detaches from a second network mobility management unit 2b and attaches to a first network mobility management unit 2a. Typically, network mobility management units manage a certain number of cells. If the mobile entity 3 leaves the associated area, it detaches from the respective network mobility management unit and attaches to another network mobility management unit. In such a case, the network mobility management unit from which the mobile entity detaches, in the case of FIG. 7 the second network mobility management unit 2b sends 75 a context request to the new network mobility management unit, in the case of FIG. 7 the first network mobility management unit 2a.

The first network mobility management unit 2a resets 74 the corresponding counter to zero. Furthermore, it responds 76 to the second network mobility management unit 2b with a context response. By setting the counter to zero, it is ensured that the mobile entity is initially paged in a first area, this means on a routing area level. At this point it may be unknown whether the mobile entity 3 moves or remains stationary.

With respect to FIG. 5-7 different situations have been discussed, in which the counter 4 is adapted. Situations have been discussed, where, based on receiving a location report, the counter has been left unchanged or has been set to zero. Furthermore, a situation has been discussed, where the counter was increased or decreased based on establishing the success or the failure of paging. These different possibilities of adjusting the counter are further illustrated with respect to FIG. 8.

Figure 8:
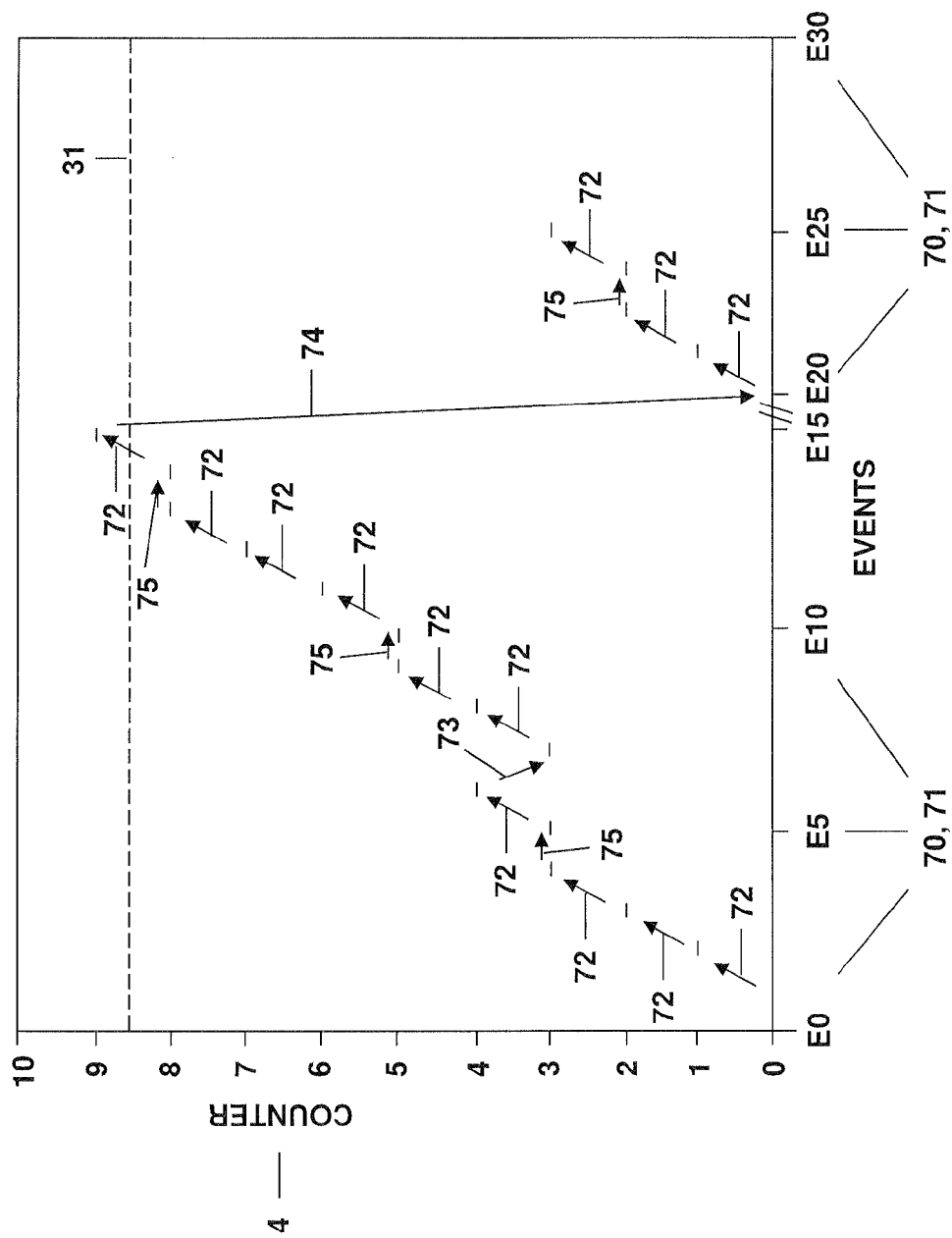
FIG. 8 illustrates a counter with a threshold for setting paging control information.

In FIG. 8, the value of the counter 4 is plotted with respect to events such as paging 70 the mobile entity or receiving 71a location report. At event E1, the counter starts at a value of zero. This may be due to a resetting the counter in case of, for example, the mobile entity newly attaching to a network mobility management unit as described with respect to FIG. 7. Because the counter is below a threshold 31, the paging control information is set to the first area mode. The respective mobile entity is paged in a first area, for example a routing area.

The counter value is successively increased to a value of three at event E3, because of three times successful paging 72. Then the event E4 corresponds to leaving 75 the counter unchanged. One possibility is that in event E4 a location report is received 71 as explained in detail with respect to FIG. 5. For example, the location report can be received in the header of a data frame which is uploaded on the mobile entity. Event E5 corresponds again to an incrementation of the counter. The counter value equals four after event E5. Therefore, during the first five events, received location reports always indicated a position of the mobile entity within the same cell.

Event E6 corresponds to decrementing 72 the value of the counter to three. The decrementation of the counter value is due to an unsuccessful paging in the first area. For example a data packet connected to the paging may have been lost or corrupted. The events E6 through E14 all correspond to successful paging, in which case the counter is incremented 72, or to a received location report, which includes an indicator indicating a position in a second area which equals the second area indicated by an indicator included in the previously received location report. Then which the counter is left unchanged 75.

At event E14 the counter value equals eight. Indicated by the horizontal dashed line is the predefined threshold 31. Event E14 corresponds to an incrementing 72 of the counter due to successful paging. Then the value of the counter 4 exceeds the threshold 31. The paging control information is set to the second area mode. This means that the mobile entity is then paged in the second area, this means in a cell. In particular, the mobile entity is paged in the cell which is identified by the last received location report. The last received location report corresponds to the location report received due to event E14 in the course of successful paging.

Paging the mobile entity on cell level can occur for certain times. In the embodiment of FIG. 8, the counter 4 is not changed due to successful or unsuccessful paging once it exceeds the threshold. It is rather left unchanged for five events. The events E15 to E18 are not graphically depicted in FIG. 8.

At event E19, however, the counter is reset 74 to zero. This is because a location report has been received, which includes an indicator indicating a position in a second area which differs the second area indicated by an indicator included the previously received location report. For example, the mobile entity has uploaded a data frame to the network mobility management unit as explained with respect to FIG. 5. This data frame contains a header which includes a location report. This results in setting the paging control information to the first area mode, because the counter 4 has a value which is smaller than the threshold 31. The mobile entity is paged in the first area mode, i.e. in a routing area.

After the counter has been reset to zero in step E19, in steps E20-E25, the counter is increased 72 and left unchanged 75. In step E25, the value of the counter 4 is three. The process continues following the rules as outlined above.

It should be understood that the embodiment explained with respect to FIG. 8 is not to be construed as being limiting. For example, other ways are conceivable why the paging control information of the mobile entity is set to the first area mode in event E19 after having been set to the second area mode. For example, when setting the paging control information to the second area mode in event E15, this means when the counter value exceeds the threshold 31, it may be tracked whether paging in the second area, this means on cell-level, is unsuccessful for another predefined number of times. If it is established that the paging on the mobile entity in a second area has been unsuccessful for another predefined number of times in events E15 to E19, the paging control information may be set to the first area mode along with resetting the counter 4 to zero. The network mobility management unit may have paged the mobile entity, for example, four times during events E15 to E19 without receiving acknowledgement. The reason why paging the mobile entity in the second area is unsuccessful may be that the mobile entity has left the second area in which it is paged. In other words, the cell through which a mobile entity is connected to the network may have changed.

Other possibilities for switching back from paging in a second area to paging in a first area are thinkable. For example, it is possible to increase and decrease the value of the counter 4 also when paging in a second area mode. When paging in a second area mode is established as being successful (unsuccessful), the value of the counter 4 may be increased (decreased). Then, when the value of the counter 4 falls below the threshold 31, the paging control information may be set to the first area mode.

Another possibility for switching back from paging in a second area to paging in a first area would be to maintain another counter with another threshold which is adjusted to another set of rules to accordingly fit the technical requirements for paging in a second area mode. Then, when a threshold comparison of this other counter yields a positive outcome, the paging of the mobile entity may be switched back to paging in the first are mode rather than in the second area mode.

Another possibility for switching back from paging in a second area to paging in a first area would be to maintain a timer. The timer may be initialized when paging in the second area mode is unsuccessful for the first time. Successful paging may result in disengaging the timer. The timer may be incremented over time. Once the timer reaches a certain threshold, a criterion for resetting the counter to zero and with it setting the paging control information to the first area mode may be fulfilled.

Figure 9:
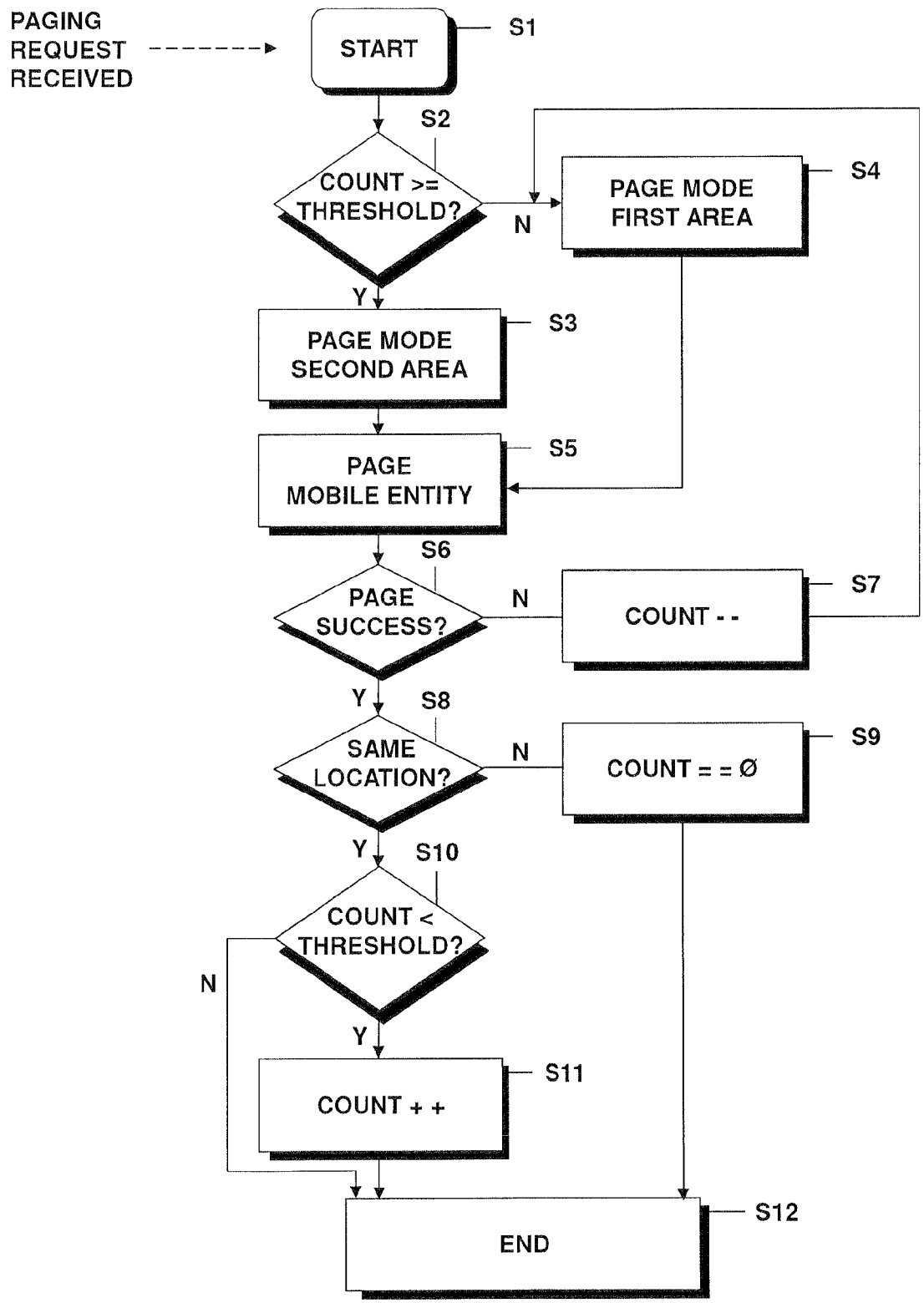
FIG. 9 is a flowchart containing the steps of selectively setting paging control information.

In FIG. 9, a flowchart is depicted which illustrates a decision chain of a network mobility management unit for setting the paging control information to either the first or the second area mode. This is based on the embodiments as described with respect to the preceding Figures. The process starts in step S1 after a paging request from a mobile entity has been received.

First, in step S2 it is checked whether a counter is larger or equal to a threshold. The counter can have an integer positive value or can equal zero. It is possible that the counter does not fall below zero.

If, in step S2, it is determined that the counter is smaller than the threshold, then in step S4 the paging control information is set to the first area mode, i.e. successive paging is performed in a first area which may be a routing area, a set of routing areas, a location area, or a set of location areas.

If, however, in step S2 it is determined that the counter is larger or equal to the threshold, the paging control information is set to the second area mode in step S3. Successive paging occurs in a second area, e.g. a specific cell. The specific cell can be the cell for which the most recently received location report included an respective indicator.

In step S5, the mobile entity is paged. The paging occurs, depending on the outcome of step S2, either in a first area or a second area as outlined above with respect to steps S3 and S4.

A possible implementation of paging in a first area mode in step S5 with respect to the 3GPP TS 48.018 V10.2.0 (2011-06) standard, i.e. for the "paging PS" message in a Gb-i or Gb-f connection between a Serving GPRS Support Node (SGSN) and a base station controller (BSC), is that the conditional parameter RA is included to indicate the routing area where the base station system (BSS) shall execute the paging.

A possible implementation of step S5 for paging in the second area mode with respect to 3GPP TS 23.003 and 48.018 V10.2.0 (2011-06), i.e. for the "paging PS" message in a Gb-i or Gb-f connection between mobility management server, e.g. a Serving GPRS Support Node (SGSN) or a Mobility Management Entity (MME), and a base station controller (BSC), is that the conditional parameter RA is included with the RAC-part coded "#FF". In addition, also the conditional parameter BVCI is included, but contains the cell identity (CGI). Then the base station system (BSS) will send the paging indication in the cell identified by the CI only.

In step S6 the paging success is established. Paging can be successful or unsuccessful. If a paging acknowledgement message is received, paging is established as being successful. If no paging acknowledgement message is received by the network mobility management unit after having sent a paging request message, paging is established as being unsuccessful. For example, one of the two messages (paging request, paging response) may have been lost. Another possibility is that the mobile entity has left the paging area.

If in step S6 it is determined that paging has been unsuccessful, in step S7 the counter is decreased. Decreasing can be decrementing the counter by a value of one. However, decrementing in step S7 may only occur if the counter is larger than zero. This ensures that the counter does not become smaller than zero, i.e. does not reach negative values.

If, however, in step S6 it is determined that paging was successful, it is determined in step S8 whether the last location report and the current location report include indicators indicating the same second area. This means it is determined whether the mobile entity has remained stationary within the same cell.

If in step S8 it is determined that the last location report and the current location report include indicators indicating the same second area, it is checked in step S10 if the counter is smaller than a predefined threshold. If the counter is not smaller than the threshold, the method ends in step S12. Otherwise, in step S11, the counter is incremented by, e.g., a value of one. Then, the method ends in step S12.

If, however, in step S8 it is determined that the last location report and the current location report include indicators indicating different second areas, i.e. if the mobile entity has changed the cell in which it is located (camping), then in step S9 the counter is reset to zero an the method ends in step S12.

Figure 10:
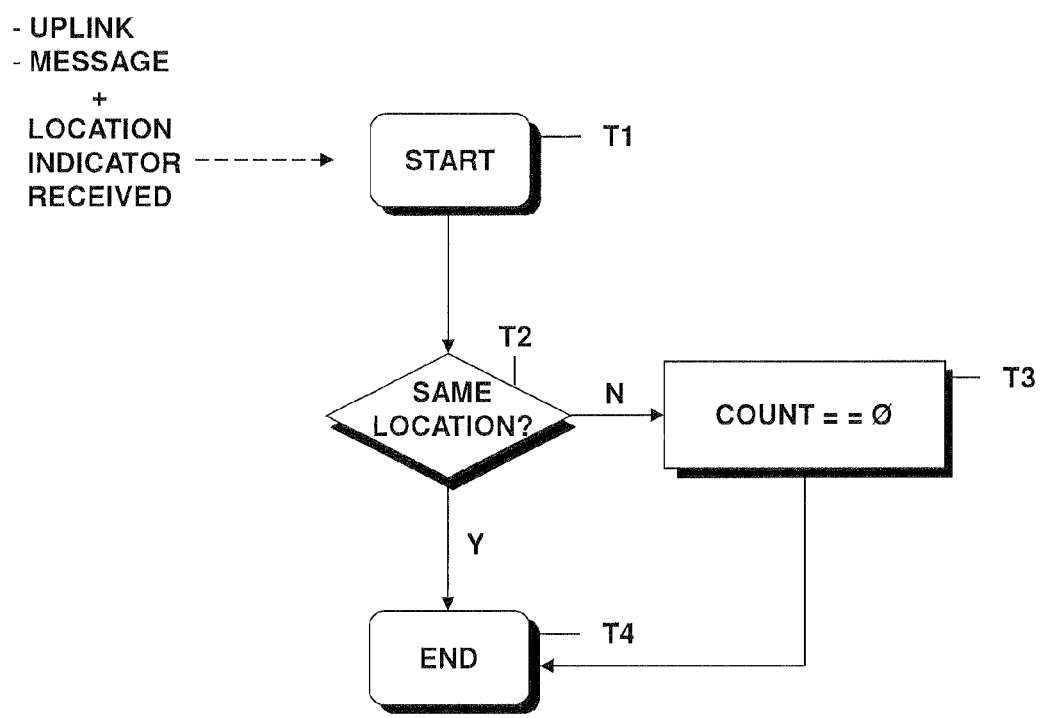
FIG. 10 is a flowchart containing the steps of determining if location reports equal each other.

It should be understood that location reports including indicators indicating a second area are not only received with respect to a paging event. For example, uploaded data frames can also contain a location report. This is illustrated with respect to FIG. 10, where a flow chart is depicted for such a case.

The method starts with step T1, where an uplink message is received together with a location indicator. In step T2, it is checked if the last location report and the current location report include indicators indicating the same second area. Step T2 relates to step S8 of FIG. 9 and has been discussed above.

If, in step T2, it is determined the last location report and the current location report include indicators indicating the same second area, the methods ends in step T4. Otherwise, the counter is reset to zero in step T2 and then the method terminates in step T4.

While devices and methods according to embodiments have been described with respect to the FIGS. 1-10, it should be understood that modifications or combinations of these embodiments may be implemented in other embodiments.

The invention claimed is:

1. A method for paging, by a network mobility management unit, a mobile entity in a cellular network, the method comprising:
   receiving plural location reports, each respectively including an indicator indicating a position of the mobile entity,
   determining whether indicators included in at least two successive location reports indicate a position in a same second area,
   selectively setting paging control information for the mobile entity to a first area mode or to a second area mode based on said determining,
   paging the mobile entity across a first area of the cellular network when the paging control information is set to the first area mode, and alternately paging the mobile entity across said second area when the paging control information is set to the second area mode, wherein said second area is a sub-area of the first area,
   establishing whether the mobile entity is successfully paged while the paging control information is set to the first area mode,
   wherein, in response to establishing that the mobile entity is successfully paged for a predefined number of times in succession and determining during paging for the predefined number of times that the indicators in the location reports indicate positions in the same second area, setting the paging control information to the second area mode, and
   wherein, when the paging control information is set to the first area mode, a counter is adjusted towards a threshold in response to establishing that paging has been successful, and the counter is adjusted away from the threshold in response to establishing that paging has been unsuccessful or determining that indicators included in at least two successive location reports indicate positions in different second areas, wherein the paging control information is set to the second area mode responsive to the counter reaching the threshold.

2. The method according to claim 1,
   wherein the counter is incremented in response to establishing in the first area mode that paging has been successful and decremented in response to establishing in the first area mode that paging has been unsuccessful; and
   wherein the counter is reset to zero and the paging control information is set to the first area mode in response to when at least one of the following occurs:
   it is determined that indicators included in at least two successive location reports indicate positions in different second areas,
   the mobile entity is attached to or detached from the cellular network,
   the mobile entity is associated with another network mobility management unit different from said network mobility management unit, and
   it is established that paging the mobile entity across the second area has been unsuccessful for another predefined number of times.

3. The method according to claim 1, wherein, when the paging control information is set to the first area mode, the mobile entity is paged in a first area in which the position of the mobile entity indicated by the last received location report is located, and
   when the paging control information is set to the second area mode, the mobile entity is paged in a second area in which the position of the mobile entity indicated by the last received location report is located.

4. The method according to claim 1, wherein plural first and second areas are fixedly distributed in an area covered by the cellular network, and the indicators included in the plural location reports respectively identify one of the plural second areas.

5. The method according to claim 1, wherein the first area is a routing area or a set of routing areas of the cellular network and the second area is a cell of the cellular network.

6. A network mobility management unit for paging a mobile entity connected to a cellular network, comprising:
   a receiver, which is configured to receive plural location reports, each respectively including an indicator indicating a position of the mobile entity, and
   a mobile entity management unit, which is configured to:
      selectively set paging control information for the mobile entity to a first area mode or to a second area mode based on whether indicators included in at least two successive location reports indicate positions in a same second area, and
      page the mobile entity across a first area of the cellular network when the paging control information is set to the first area mode, and to page the mobile entity across said second area when the paging control information is set to the second area mode, wherein said second area is a sub-area of the first area,
   wherein, when the paging control information is set to the first area mode, the mobile entity management unit is configured to set the paging control information to the second area mode in response to when the mobile entity is successfully paged for a predefined number of times in succession and when during paging for the predefined number of times indicators in the location reports indicate positions in the same second area, and
   wherein the mobile entity management unit comprises a counter and when the paging control information is set to the first area mode, the mobile entity management unit is configured to:
      adjust the counter towards a threshold in response to when paging has been successful, and
      adjust the counter away from the threshold in response to when paging has been unsuccessful or when two indicators included in at least two successive location reports indicate positions in different second areas,
   wherein the mobile entity management unit is configured to set the paging control information to the second area mode responsive to the counter reaching said threshold.

7. The network mobility management unit according to claim 6,
   wherein, when the paging control information is set to the first area mode, the mobile entity management unit is configured to increment the counter in response to when paging has been successful and to decrement the counter in response to when paging has been unsuccessful, and
   wherein the mobile entity management unit is configured to reset the counter to zero and to set the paging control information to the first area mode in response to when at least one of the following occurs:
   indicators included in at least two successive location reports indicate positions in different second areas,
   the mobile entity is attached to or detached from the cellular network,
   the mobile entity is associated with another network mobility management unit different from said network mobility management unit,
   paging the mobile entity across the second area has been unsuccessful for another predefined number of times.

8. The network mobility management unit according to claim 6, wherein, when the paging control information is set to the first area mode, the mobile entity management unit is configured to page the mobile entity across a first area in which the position of the mobile entity indicated by the last received location report is located, and
   when the paging control information is set to the second area mode, the mobile entity management unit is configured to page the mobile entity across a second area in which the position of the mobile entity indicated by the last received location report is located.

9. The network mobility management unit according to claim 6, wherein the area covered by the cellular network is subdivided into plural first areas, and at least some of said plural first areas are respectively subdivided into plural second areas, wherein the plural first and second areas are fixedly distributed.

10. The network mobility management unit according to claim 6, wherein the first area is a routing area or a set of routing areas of the cellular network and the second area is a cell of the cellular network.

* * * * *